United States Patent [19]

Salembier et al.

[11] Patent Number: 5,036,388
[45] Date of Patent: Jul. 30, 1991

[54] APPARATUS INCLUDING AN IMPROVED DEVICE FOR RECOVERING THE D.C. COMPONENT

[75] Inventors: Philippe Salembier, Paris; Pascal Hayet, Brunoy, both of France

[73] Assignee: U.S. Philips Corporation, New York, N.Y.

[21] Appl. No.: 431,499

[22] Filed: Nov. 3, 1989

[30] Foreign Application Priority Data

Nov. 10, 1988 [FR] France .................. 88 14685
May 30, 1989 [FR] France .................. 89 07097

[51] Int. Cl.$^5$ .................................... H04N 9/72
[52] U.S. Cl. ......................... 358/34; 358/171
[58] Field of Search ............ 358/34, 171, 172, 173

[56] References Cited

U.S. PATENT DOCUMENTS 4,707,730 11/1987 Alard .................................. 358/13
4,713,694 12/1987 Zwoin ................................ 358/171

FOREIGN PATENT DOCUMENTS 57-208770 12/1982 Japan .............................. 358/171

OTHER PUBLICATIONS

Principles of communication systems, 2nd ed., Taube Schilling; pp. 298-301, 1986.

*Primary Examiner*—James J. Groody
*Assistant Examiner*—Kim Yen Vu
*Attorney, Agent, or Firm*—Edward W. Goodman

[57] ABSTRACT

The apparatus performs a processing operation on the signal in a transmission system, this signal conveying analog luminance and chrominance information components associated with periods of the coded digital signal. A receiver in a MAC television system is, for example, such a device. The device for recovering the d.c. component includes encoding member (4) which, from the decoded digital signal, realizes an encoding operation of the type used for the creation of the received signal, an estimation circuit for the d.c. component (6) calculating the estimation from the difference between the received coded signal and the recovered coded signal by the encoding member, this estimation constituting d.c. component correction signal, and a subtraction circuit (9) which, from the digital signal received, subtracts the d.c. component correction signal throughout the duration of a line. The apparatus also includes, downstream of the device (6) which supplies the d.c. component correction signal, a filter (8) which utilizes d.c. component correction signals of several line scanning periods simultaneously to improve the d.c. component correction signal, which is of the finite-impulse-response type, for example a mean-value taking circuit, and the received signal is delayed (10) for compensating for delay caused by the filter, before being conveyed to the subtraction circuit (9).

9 Claims, 1 Drawing Sheet

APPARATUS INCLUDING AN IMPROVED DEVICE FOR RECOVERING THE D.C. COMPONENT

BACKGROUND OF THE INVENTION

1. Field of the Invention

The present invention relates to an apparatus for receiving a signal conveying analog luminance and chrominance information components associated with coded digital signal periods, comprising a d.c. component recovery circuit and a decoder circuit for decoding the received digital signal. Such a signal is more specifically a signal of the MAC type, which comprises analog luminance and chrominance information components and digital information components coded per packet as well as analog reference voltage plateaus of the average grey level.

Such an apparatus is, for example, a television set arranged for receiving a signal in the D2-MAC/packet mode, or a satellite tuner or even any other apparatus having a member effecting a processing operation of the signal in a transmission system.

2. Description of the Related Art

Such an apparatus is disclosed in, for example, French Patent Application FR-A-2, 610,773. As described in that document, a television set is provided with means for re-establishing the d.c. component, in different successive stages which are separate from each other, first on the basis of the peak levels measured over the overall signal, then on the basis of the peak levels which are measured only on that part of the signal which is digital, and finally on the basis of the reference voltage plateaus of the signal.

The problem to be solved stems from the fact that the so-called "dc" component, which also comprises a low-frequency component, is negatively influenced by the disturbances which are inherent to all types of transmission systems, whether they are correlated or not correlated with the television signal. These disturbances constitute a parasitic signal comprising two components, i.e. noise having a frequency which is lower than to the line frequency (low-frequency break, energy dispersion, 50 Hz residue, etc. . . . ), and modulation noise whose spectral power distribution depends on the type of transmission.

In the television set described in said document, these levels are subject, when peak levels are used which are measured over the digital part to the signal, of varying versus the digital content of the signal, and the recovery of the d.c. component will not be accurate, and when the reference plateau is used to extract this component, one meets with the theoretical limits of recovery of a signal in the noise. Actually, the plateau duration, which is very short, does not permit of a sufficient integration of one line. Simple filters have been proposed which integrate the information components of several lines. Based on the principle of a first-order recursive filter, they have the advantage of reducing the noise in the case of unfavorable transmission types, but they lead to a measuring error of the low-frequency component. The trials effected for a transmission of a television signal in accordance with the D2-MAC/-packet standard have shown how difficult it is to obtain a compromise between noise and low-frequency residues, which compromise must be adapted to each specific case constituting each modulation type.

SUMMARY OF THE INVENTION

The invention provides an apparatus in which these problems can be solved. To this effect, the d.c. component recovery circuit comprises an encoding member for effecting, on the basis of the decoded digital signal, a coding operation similar to the type of that used for the creation of the received signal, a d.c. component estimating circuit for calculating said estimation from the differences between the coded signal received and the coded signal recovered by said coding member, this estimation constituting a d.c. component correction signal, and a subtraction circuit for subtracting said correction signal from the signal received, throughout the period of one line.

Advantageously, it also includes, provided at the output of the estimating circuit, a filtering circuit which is advantageously a simple mean-value calculating means. This has the advantage that the occurrence of noise during the determination of the d.c. component is reduced.

Moreover, the apparatus is advantageously provided, at the input of the decoder, with a subtracting circuit for subtracting the correction signal from the received signal. This has for its effect to increase the reliability of the decoding operation.

With the same object, the apparatus for receiving a signal conveying analog luminance and chrominance information components associated with coded digital signal periods, comprising a decoder circuit for decoding the digital signal received, and a device for supplying a d.c. component correction signal, having an output coupled to a filter for using the correction signals of a plurality of line scanning periods simultaneously to improve the correction signal, and a subtraction circuit for subtracting the correction signal from the received signal, is characterized in that the filter is of the finite impulse response type, for example a mean-value producing means, and in that the apparatus comprises means for delaying the received signal, before being applied to the subtraction circuit, to compensate for the delay produced by the filter.

The invention is consequently based on the principle of extracting additional information components from the low-frequency component of the signal by efficiently using the digital period, and on the other hand of integrating these information components over several lines with the aid of an appropriate filter which preserves the low-frequency component.

A further important characteristic of the invention is based on the recognition that the presence of the coding member allows an estimation of the reliability of the received signal. The apparatus is therefore advantageously provided with a validation circuit which, on the basis of the measurement of the deviation between the received signal and the recovered signal, controls taking account of the correction signal.

DESCRIPTION OF THE PREFERRED EMBODIMENT

An amplified signal is available, for example, of the D2-MAC-packet type, which first has a duobinary-encoded digital data period whose duration is 10 μs, thereafter, a mean grey level reference plateau of a duration of only 0.75 μs, followed by an analog signal period which represents the chrominance information components and an analog signal period which represents the luminance information components which terminate the line.

Figure 1:
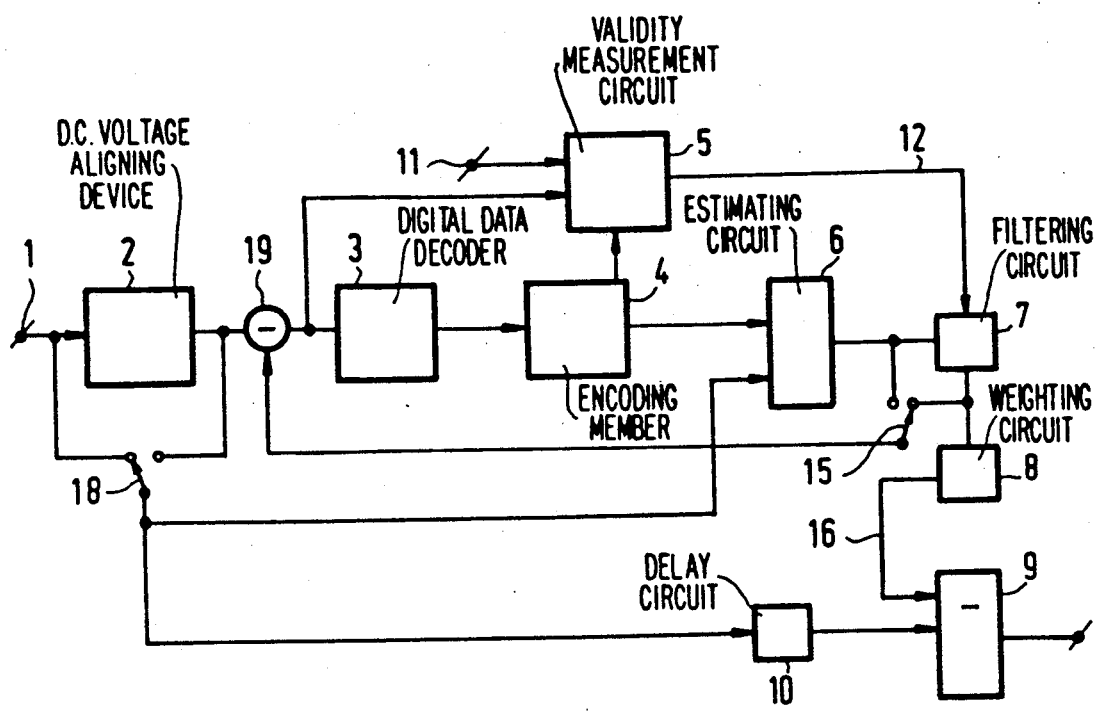
FIG. 1 is a block diagram of the preferred embodiment of a d.c. component recovery device in an apparatus according to the invention.

In FIG. 1, the amplified signal available at 1 is in the first instants conveyed to a conventional d.c. voltage aligning device 2 based on the line plateaus. The device also includes a digital data decoder 3, followed by an encoding member 4 for encoding these data of the type similar to the encoder used to create the received signal. The digital data decoder 3 can conventionally be in the form of a low-pass filter having a cut-off frequency of 5 MHz followed by a decoder having a threshold, or optionally a Viterbi decoder.

An associated circuit 5 enables the measurement of the validity of the recovered digital signal by basing itself on the signal present at the input of the decoder 3. The recovered coded digital signal is compared in the estimating circuit 6 with the available signal, which is there taken from either the input 1, or from the output of the conventional d.c. voltage aligning system 2, which choice is shown symbolically in the Figure by means of charge-over switch 18 which need not be physically there, it being possible to make a definite branching choice by the construction of the device. The estimating circuit 6 produces a correction signal on the basis of this comparison. In its most simple form, the estimating circuit 6 is a circuit which subtracts the received signal and the recovered signal from each other. Alternatively, in a more sophisticated version which, however, is not indispensable, it may be in the form of a recursive circuit which corrects a proceeding correction signal by adding thereto a signal calculated from the differences between the received signal and the recovered signal (that is to say not only the difference in the arithmetic sense but also further parameters representing a non-similarity) weighted by a fixed or variable coefficient which may depend on characteristics of the transmission channel.

The estimating circuit 6 is followed by a filtering circuit 7. In addition to the information components present on the ordinary reference plateau (which are always available, the signals of this plateau being processed by the circuit 6 as forming part of the duobinary burst), the filtering circuit 7 uses information components extracted from the duobinary burst and supplied by the circuit 6, which, when they are validated, allow of the reconstruction of the low-frequency component. This filtering circuit 7 which, in a preferred embodiment, is in the form of a simple mean-value taking means, produces a value-result per line. The correction signal is subtracted from the signal received at the input of the decoder 3, in a subtraction circuit 19. Depending on the position of a change-over switch 15, the signal thus subtracted is either the signal available at the output of the estimated circuit 6, or the signal available at the output of the filtering circuit 7. As in the case of the switch 18, there can be no switch 15 when a definite branching pattern has been chosen by the construction of the device. The value-result supplied by the filtering circuit 7 is thereafter processed by a weighting circuit 8 so as to improve its value by weighting it with those values obtained for the preceding lines. This weighting circuit 8, which is a filter, can supply an information in synchronism with the current line, or an information which is delayed by the duration of an integral number of lines. Last of all, the correction signal is subtracted by the subtraction circuit 9, throughout the duration of a line, from the signal available at either the input 1, or optionally at the output of the conventional d.c. voltage aligning system 2, which signal is optionally delayed (depending on the delay of the line filter) in a delay circuit 10 so as to ensure that the two signals are in synchronism.

Figure 2:
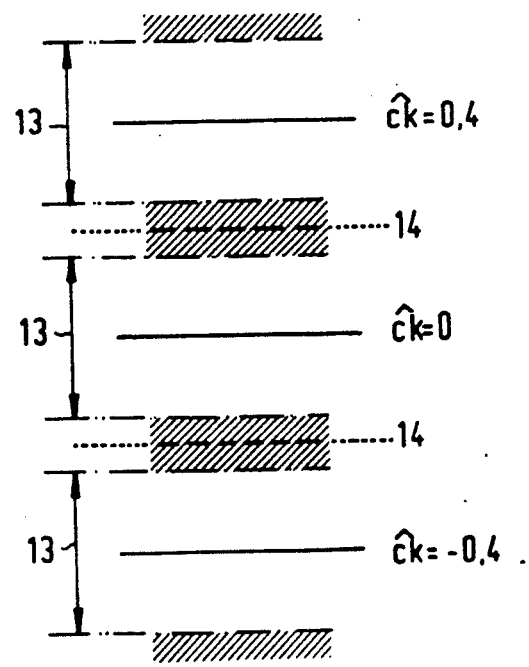
FIG. 2 illustrates levels which are taken into account for the decision and recoding for the case of a signal of the duobinary type, and of a decoder having a threshold.

FIG. 2, in which the reference numerals 14 indicate the decision thresholds and the reference numerals 13 indicate three ranges of the same width, said width defining a reliability threshold, illustrates the recovery of the duobinary train for the case in which the element 3 is a decoder having a threshold.

This recovery is summarized by the following logic operations:

if $|c_k - C_c| \leq$ decison threshold (14), then $\hat{c}_k = 0$ if $c_k - C_c <$ negative decision threshold (14), then $c_k = -0.4$ if $c_k - C_c >$ positive decision threshold (14), then $c_k = +0.4$ wherein $c_k$ represents the value (digital value in volts) of the duobinary sample received, $c_k$ represents the value of the recovered duobinary sample, and $C_c$ represents the value of the d.c. component subtracted at the input of the decoder 3.

The validity measurement circuit 5 produces an estimation of the reliability of the recovery of the duobinary signal in the form of a validation signal 12 which is intended for the filtering circuit 7. To that end, it operates in the following manner: the recovered signal is compared with the duobinary signal present at the input of the decoder 3, and a voltage applied at 11 defines a reliability threshold which represents the maximum difference allowed between the two signals beyond which the recovered sample will not be taken into account any more in the calculation of the low-frequency component. In the case, for example, of a decoding/re-coding into D2-MAC-packet, which bears on 105 bits per line, the decision whether the sample is taken into account or not taken into account is taken for each one of these 105 bits.

The function performed by this validity measurement circuit 5, which is very simple, is summarized by the following logic operation:

if $|c_k - C_c - \hat{c}_k| <$ reliability threshold, then validation is effected.

Thus, the device is provided with a validation circuit which, starting from the measurement of the deviation between the received signal and the recovered signal, controls taking into account of the correction signal.

In a preferred embodiment, the weighting circuit 8, which allows weighting of the information coming from the filtering circuit 7 for the values obtained on the preceding lines, is in the form of a non-recursive filter, commonly denoted as a "finite impulse response" filter. This filter has the advantage that it has a response whose delay relative to the input data is fixed by a given filter length and could thus be compensated so as to ensure a perfect synchronization.

A simple and advantageous embodiment is constituted by a mean-value taking means which preferably act on an odd number of data. The delay generated by the mean-value taking means is equal to half its length, and consequently is equal to $(N-1)/2$ line periods if the filter acts on N data. In this case, delay circuit 10 delays the signal available at the input 1 or optionally at the output of the conventional d.c. voltage aligning system 2 by this value.

We claim:

1. An apparatus for receiving a signal conveying analog luminance and chrominance information components associated with coded digital signal periods, comprising a d.c. component recovery circuit and a decoder circuit for decoding the received digital signal, characterized in that the d.c. component recovery circuit comprises an encoding member for effecting, on the basis of the decoded digital signal, a coding operation of the type used for the creation of the coded digital signal in the received signal, a d.c. component estimating circuit for calculating said estimation from the differences between the coded digital signal received and the coded digital signal recovered by said encoding member, this estimation constituting a d.c. component correction signal, and a subtraction circuit for subtracting said d.c. component correction signal from the received signal throughout the period of one line.

2. An apparatus as claimed in claim 1, characterized in that the apparatus further includes a filtering circuit coupled to an output of the estimating circuit.

3. An apparatus as claimed in claim 2, characterized in that the filtering circuit is a simple mean-value taking means.

4. An apparatus as claimed in claim 1, characterized in that it is provided, at the input of the decoder circuit, with a subtracting circuit for subtracting the d.c. component correction signal from the received signal.

5. An apparatus as claimed in claim 1, wherein the decoder circuit is of the type having a threshold, and the encoding member is a logic circuit for effecting the following logic operation:

if $|c_k - C_c| \leq$ decision threshold, then $\hat{c}_k 0$, if $c_k - C_c <$ negative decision threshold, then $\hat{c}_k$ takes a standard negative value, if $c_k - C_c >$ positive decision threshold, then $\hat{c}_k$ takes a positive standard value, wherein $c_k$ represents the value of the duobinary sample received, $\hat{c}_k$ represents the value of the recovered duobinary sample, and $C_c$ represents the value of the correction signal.

6. An apparatus as claimed in any one of the claims 1 to 4, characterized in that said apparatus further includes a validation circuit for, from the measurement of the deviation between the received coded digital signal and the recovered coded digital signal, controlling the taking into account of the d.c. component correction signal.

7. An apparatus as claimed in claim 6, characterized in that the validation circuit includes means for controlling the taking of the correction signal into account if $|c_k - C_c - \hat{c}_k|$ is less than a predetermined reliability threshold, $c_k$ representing the value of the received duobinary sample, $\hat{c}_k$ representing the value of the recovered binary sample, and $C_c$ the d.c. component value of the correction signal.

8. An apparatus as claimed in claim 1, characterized in that it moreover includes, coupled to an input of the decoder, a d.c. component aligning device based on analog voltage plateaus contained in the signal received.

9. An apparatus for receiving a signal conveying analog luminance and chrominance information components associated with periods of a coded digital signal, including a decoder circuit for decoding the coded digital signal received, and a device for supplying a d.c. component correction signal, having an output coupled to a filter is arranged for using d.c. component correction signals of several line scanning periods simultaneously to improve the d.c. component correction signal, and a subtraction circuit for subtracting the d.c. component correction signal from the coded digital signal in the received signal, characterized in that this filter is a finite-impulse-response type filter, and in that the apparatus comprises means for delaying the received signal, before being applied to the subtraction circuit, to compensate for the delay caused by the filter, before being applied to the subtracter circuit.

* * * * *